Inventor.
Howard W. Anderson.
By Brown, Jackson, Boettcher & Dienner
Attys

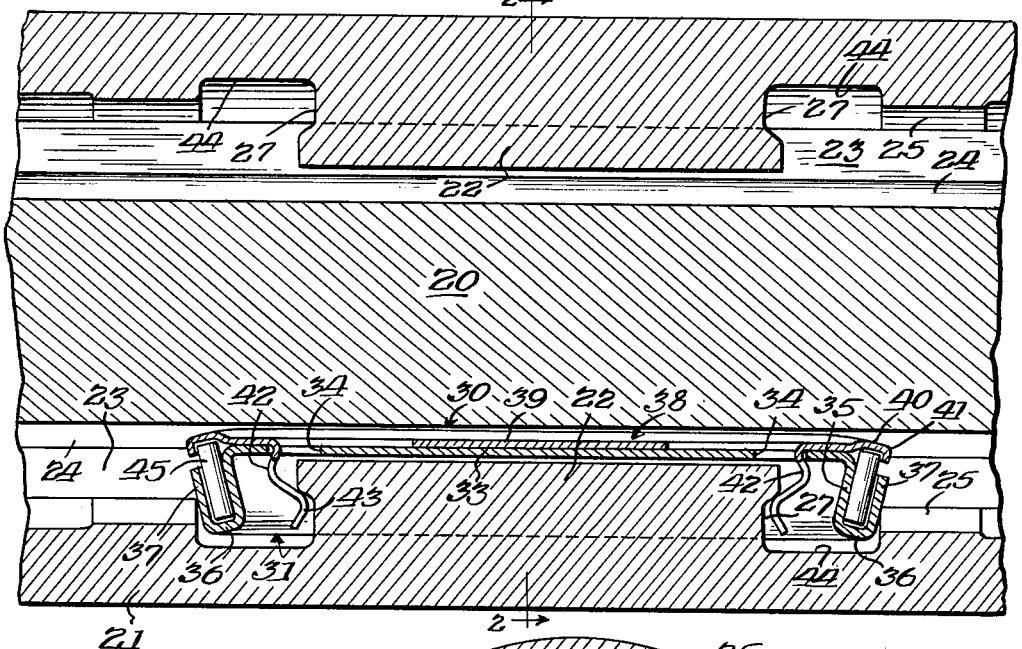
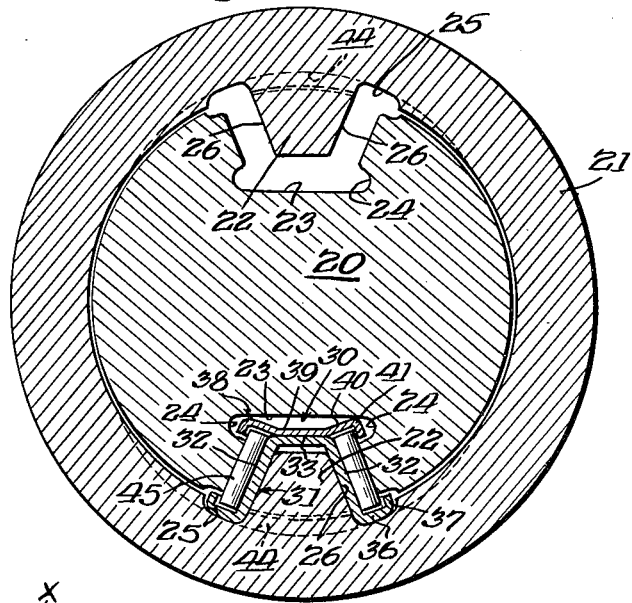
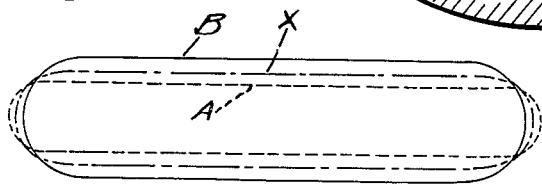

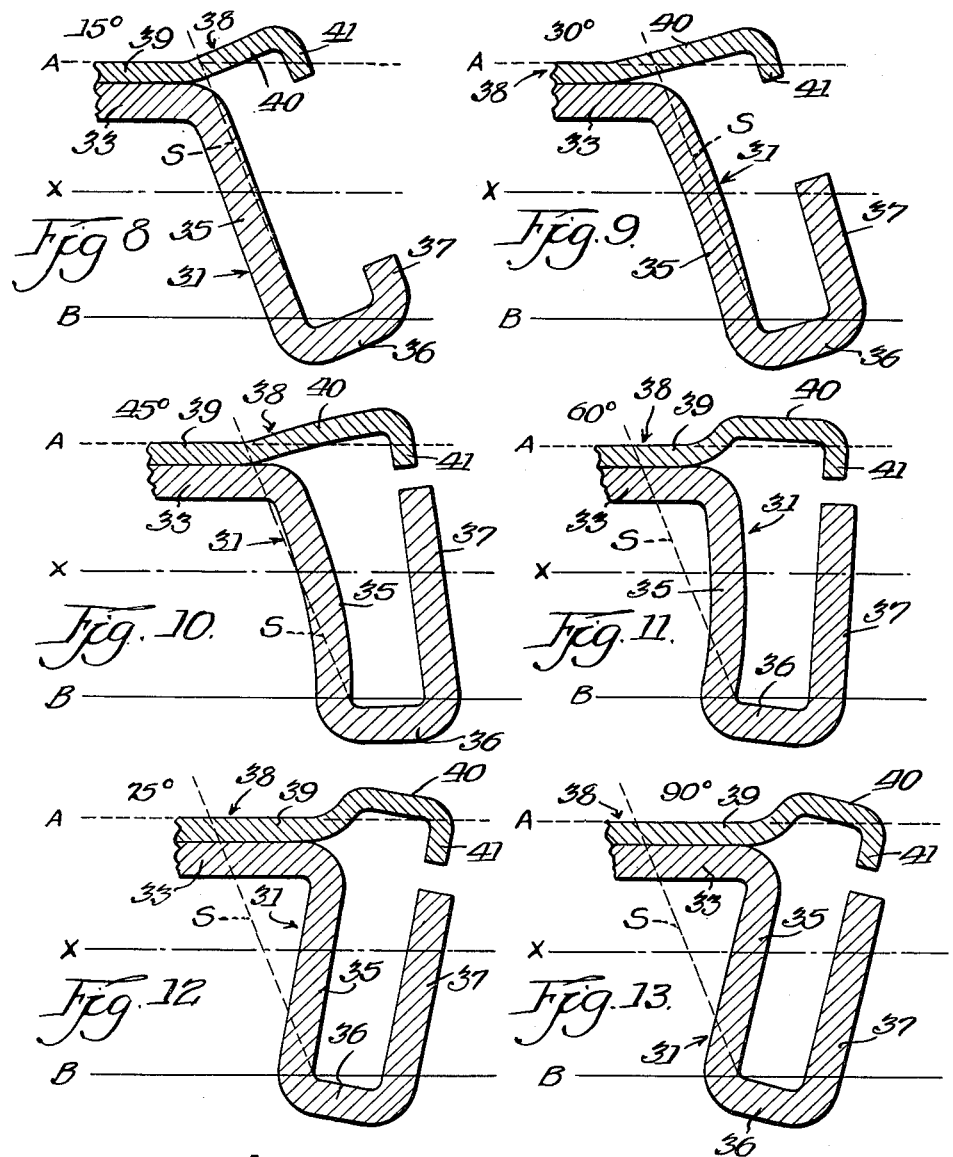
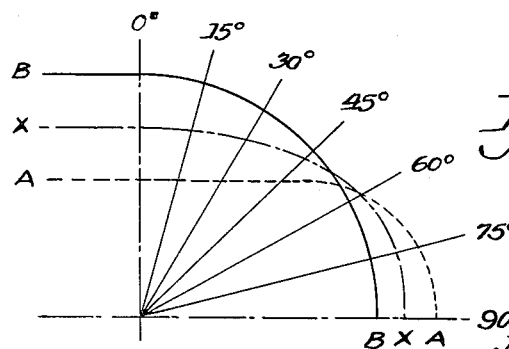

United States Patent Office 3,210,136
Patented Oct. 5, 1965

3,210,136
RECIRCULATING SPLINE BEARING
Howard W. Anderson, Muskegon, Mich., assignor to The Kaydon Engineering Corporation, Muskegon, Mich., a corporation of Michigan
Filed Mar. 27, 1963, Ser. No. 268,370
8 Claims. (Cl. 308—6)

The present invention relates to recirculating roller bearings for simultaneously transmitting torque and allowing relative linear motion between machine elements or similar parts, as in a sliding spline joint.

The use of recirculating needle roller bearings to reduce friction between the relatively movable parts of splined joints is commonly known, but heretofore such arrangements have been of limited value because known bearing constructions of this type have been employable only on splines having parallel sides. When torque is transmitted through such a parallel-sided spline, the torque load is applied to the roller bearings on the sides of the spline at an angle other than 90° to the roller axis, thus subjecting the rollers to a resultant end thrust load. This of course reduces the torque load carrying capacity of the bearing, as well as its effectiveness in eliminating friction between the parts in longitudinal movement thereof during the transmission of torque. By the present invention, a recirculating needle bearing is provided for use on splines employing load-carrying surfaces angled relative to each other instead of being parallel, thus allowing the bearing to receive torque loads in a direction substantially normal to the roller axis. In other words, each point of contact between the roller and the supporting spline or race surface falls in a substantially radial line of the roller, and the lines of force between such surface and the roller surface are approximately perpendicular to the planes of these surfaces, thus minimizing or eliminating end thrust loads on the rollers. This not only increases the effective torque load capacity of the bearing, but also simplifies the manufacture of the spline shaft, since the mating surfaces tend to align themselves under load, in contrast to the difficulties with such alignment encountered in constructions employing splines with parallel side faces. The improved bearing of the invention is not restricted in application to sliding spline joints or the like, being well adapted, for example, to use between relatively movable machine elements subjected to lateral or thrust loads, the design and construction of the bearing being such that the combination loading can be carried in the same bearing. This materially reduces the total number of bearings required for each machine assembly.

It is accordingly an object of the invention to provide a recirculating roller bearing adapted to minimize friction between relatively movable parts and at the same time carry lateral, thrust, or torque loads.

Another object is the provision of a recirculating roller bearing which reduces friction between relatively movable parts and receives lateral, torque, or other loads acting in a direction transverse of the direction of movement of the parts in a plane substantially normal to the axis of the rollers, so as to eliminate or minimize end thrust loads on the rollers with consequent maximum capacity for such transverse loads.

Another object is the provision of a recirculating needle roller bearing for a spline of a sliding rotatable spline joint in which the rollers along opposite sides of the bearing are disposed in intersecting planes whereby torque loads transmitted through the spline are imposed upon the rollers in a direction substantially normal to the roller axis to minimize end thrust loads on the rollers.

A further object of the invention is the provision of a recirculating roller bearing for relatively movable parts subject to loads substantially transverse of the direction of relative movement of the parts which has simple means integral therewith for securing the bearing parts in assembled relation and securing the assembled bearing between the relatively movable parts.

Other and further objects, advantages, and features of the invention will be apparent to those skilled in the art from the following detailed description in conjunction with the accompanying drawings, in which:

FIG. 1 is an enlarged longitudinal sectional view through a sliding spline joint showing a bearing according to the invention applied to a spline;

FIG. 2 is a cross-sectional view taken substantially as indicated by the line 2—2 of FIG. 1;

FIG. 6 is a diagrammatic representation of the locus of the points of intersection of the roller center lines with planes A, X and B;

FIG. 7 is an enlarged view of an end portion of FIG. 6; and

FIGS. 8 to 13 inclusive are enlarged cross-sectional views through the bearing at intervals of 15° about half of a rounded end thereof, as indicated in FIG. 7.

Figure 3:
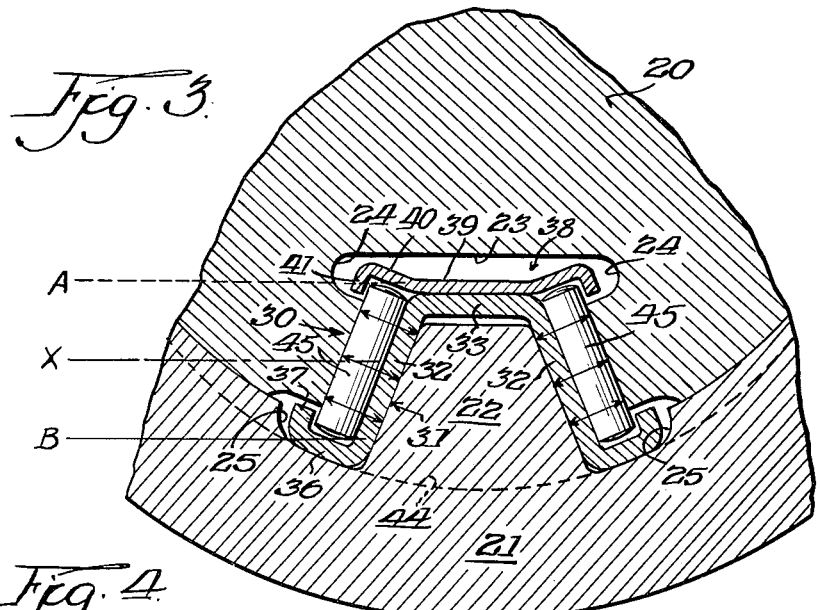
FIG. 3 is a fragmentary further enlarged view of a portion of FIG. 2.
Figure 5:
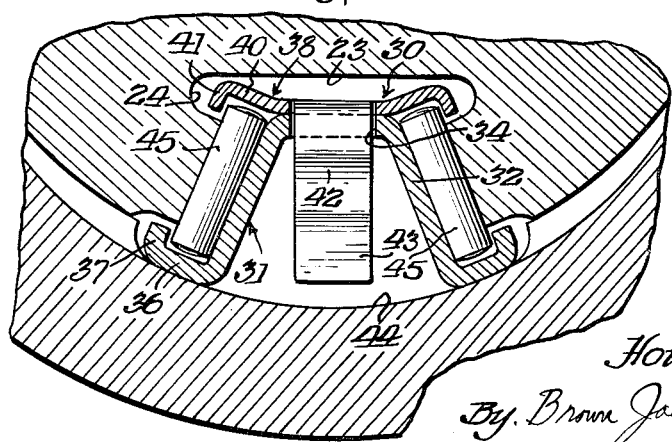
FIG. 5 is a cross-sectional view taken substantially as indicated by the line 5—5 of FIG. 4.

Referring first to FIGS. 1 and 2, there is shown a shaft 20 slidably received in a yoke or sleeve 21, as in the case of a rotary universal joint, the sleeve being shown as provided with a pair of opposed radially inwardly extending splines 22 through which torque is transmitted between the sleeve and shaft. Of course, more than two splines 22 may be employed, two being shown for convenience in illustration. Each spline is accommodated by a keyway or groove 23 formed in the shaft 20 and conforming generally in section to the spline, but of appreciably greater dimensions so as to allow considerable space along the spline. In addition, the groove has undercut portions 24 at the junctures of the sides and bottom thereof, as shown in FIGS. 2, 3 and 5. The inner face of sleeve 21 is also cut away along the base of the spline at each side to form longitudinal channels or grooves 25. The spline has the opposite longitudinal sides 26 thereof flat and straight, or planar, and sloped or converging toward each other from the root or base of the spline. In the present instance, the included angle is 45°, each side extending at an angle of 22½° to the axial plane bisecting the spline. This angle, however, may vary approximately between 5° and 85°, that is, the angle included between the sides of the spline may vary from about 10° to 170°, depending upon the particular application and size of the assembly in which the bearing is employed. In the construction illustrated, also, the splines are shown as having the ends undercut as at 27, for the purpose of attachment of the bearings thereon.

The grooves 23 and 25 together allow a bearing according to the invention, generally designated as 30, when applied to the spline to move longitudinally therewith relative to the shaft 20. The bearing comprises an elongated cup 31 which provides the inner race of the bearing, having a pair of straight flat or planar side wall portions 32 which converge from the open mouth of the cup at the same angle as the sides of the spline and are joined at their more closely spaced edges to the opposite edges of the cup bottom 33, which adjacent its ends is apertured as at 34. The cup 31 is longer than the spline, and has curved end wall portions 35 which connect the opposite ends of the straight side wall portions 32. The curved end wall portions 35 each have one edge extending as a connecting continuation of the more widely spaced edges of the planar wall portions 32 whereby to define therewith one peripheral edge of the inner bearing race. The curved end wall portions 35 also each have an other edge extending as a connecting continuation of the more closely spaced edges of the planar wall portions 32 joined to the cup bottom 33 whereby to define therewith an other peripheral edge of the inner bearing race. The cup is provided with a peripheral flange 36 which projects outwardly from the peripheral edge of the wall portions 32 and 35 at the mouth of the cup, and which has an upturned or rebent retaining lip 37. The flange 36 is substantially perpendicular to the side wall portions 32 of the cup. The cup 31 may be formed, as by a drawing operation, of sheet metal of suitable characteristics.

Figure 4:
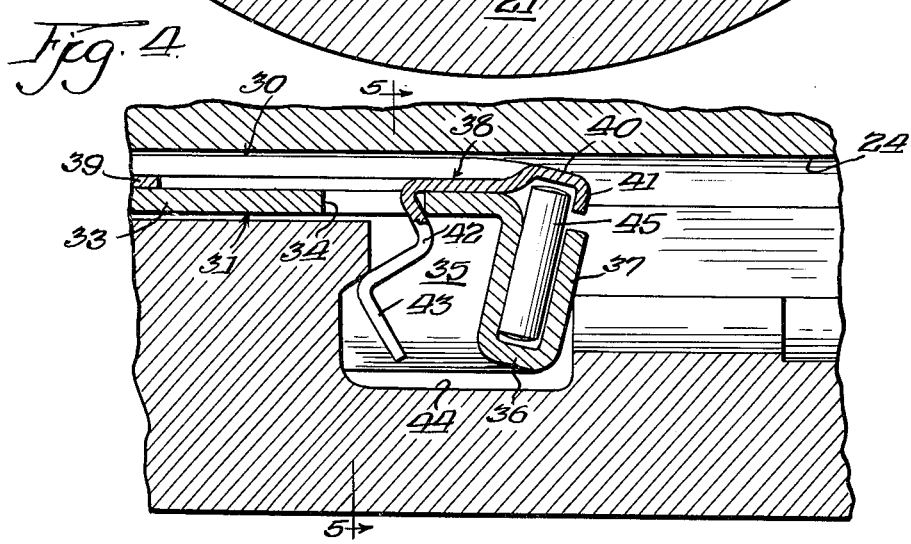
FIG. 4 is a fragmentary further enlarged view of an end portion of a spline and bearing as shown in FIG. 1.

A cap 38, which also may be formed of sheet metal, preferably of somewhat lighter gauge than that employed for the cup, is provided for cooperation with the cup. The cap 38 has a flat central portion 39 engageable on the bottom 33 of the cup 31, from which central portion extends outwardly a peripheral flange or marginal portion 40 which has a rebent lip 41 at its outer edge. The flange 40 is arranged at an angle to the central portion of the cap such that it extends in substantially parallel relation to the peripheral flange 36 of the cup 31 along the sides of the bearing when the cap is disposed on the cup bottom 32. Adjacent each end, the cap has struck from the central portion 39 thereof a resilient clip or tongue 42 which is reversely bent substantially as shown, the line of attachment of the tongue to the cap being adjacent the outer edge of the aperture 34 of the cup bottom. Each tongue projects through the adjacent cup aperture when the cap is disposed on the cup, and by reason of its bent formation resiliently engages under the adjacent aperture edge to secure the cap 38 and cup 31 in assembled relation, so that the bearing may be handled as a unit. The tongues also secure the bearing to the spline, the free end portion 43 of each tongue resiliently engaging with the adjacent undercut end portion 27 of the spline when the bearing is disposed on the spline, the planar side wall portions 32 of the cup 31 engaging in substantially full surface contact on the sides of the spline, with the portions of flange 36 which extend along the side wall portions 32 disposed in the grooves 25. The bottom of the cup 31 overlies the inner face of the spline, and the undercut groove portions 24 receive the side portions of the flange 40, all as evident from FIGS. 2 and 4. Adjacent the ends of the spline, the inner face of the sleeve 21 is cut away arcuately about a center eccentric of the sleeve so as to provide a crescent-shaped space 44 as best shown in FIG. 5 for accommodating the end portions of the bearing without binding or even contact thereof and assuring freedom to the resilient securing tongues 42.

As will be obvious, the cap and cup might be secured together otherwise than by the tongues 42, if desired, as by rivets, bolts, spot welds, or the like. Similarly, the bearing might be secured on the spline by means of bolts or screws rather than by the tongues. The tongues, however, provide simple and always-present means for holding the parts of the bearing together in the desired assembled relation, and for holding the assembled bearing on the spline. It will also be evident that the structure provided by the cap and cup might be formed as a unitary or even integral part.

The bearing 30 is completed by a plurality of needle rollers 45 which are disposed on the race defined by the wall of the cup 31, with the opposite ends received in the guide channels provided by the flanges 36 and 40 and the respective lips 37 and 41 thereof. The rollers preferably have a length slightly less than the distance between the flanges 36 and 40. The rollers are disposed completely around the cup 31, with appropriate clearance provided between them, so as to roll along the straight or planar side wall portions of the cup upon relative longitudinal movement of the shaft and sleeve, and to pass back and forth around the ends of the cup as required by the movement of the parts. Friction between the sleeve and shaft is thus largely eliminated, and at the same time, by reason of the angled disposition of the sides of the spline and the corresponding angularity of the straight side wall portions 32 of the bearing cup 31 and therefore of the needle rollers 45 disposed thereon, torque transmitted between the shaft 20 and sleeve 21 through the spline 22 acts in a line substantially perpendicular to the axis of the rollers, as indicated by the arrows in FIG. 3. As has already been pointed out, end thrust loads on the rollers are thus eliminated, or at least very greatly minimized. The capacity of the bearing to sustain torque loads is thus maintained at the maximum for any particular application, as well as to reduce friction in relative longitudinal movement of the parts during the transmission of torque. It may here be pointed out that the formation of the splines with converging rather than parallel side surfaces, in addition to the advantage of application of torque load to the bearing in the manner described, also simplifies the manufacture of the splined shaft, because the mating surfaces tend to align themselves under load, so that the engagement therebetween is full and solid, in contrast to the difficulties in obtaining proper engagement between the bearing and the adjacent surface of the other part when the parallel-sided spline formation is employed.

It will be apparent that in order for the rollers 45 to move in either direction on the planar or straight side wall portions 32 of the cup in relative longitudinal movement of the shaft 20 and sleeve 21, some of the rollers must pass at least partially about the ends of the cup or inner bearing race, and that the bearing rollers must be maintained in substantially parallel relation continuously around the entire race or cup, if skewing and/or sliding of the rollers and consequent friction between the rollers and the cup wall or race is to be avoided. To assure that the rollers will remain in parallel relation with each other and in rolling and non-frictional contact with the cup wall, it is necessary that the paths of both ends of the rollers be equal. Since the rollers 45 on one of the side wall portions 32 and the rollers at the other side are spaced farther apart at the ends thereof adjacent the peripheral flange 36 than at the ends adjacent the cap flange 40, the distance through which the roller ends adjacent flange 36 travels from one side to the other, or in other words around the curved ends 35 of the cup, must be shorter than the corresponding travel of the other ends of the rollers. The wall of the cup thus must be so formed at the ends as to be angled more or less reversely of its angularity at the sides of the cup, the bottom 33 of the cup having a greater longitudinal extent than the open side or mouth, as best shown in FIG. 1.

Three planes A, B and X are shown in FIG. 3. Plane A is the plane of intersection of the axes of the rollers 45 with the inner surface of the cap flange 40 along the straight cup side wall portions 32, plane B is the plane of intersection of the axes with the inner face of peripheral flange 36, also along the straight side wall portions 32, and plane X lies parallel to and half-way between planes A and B, and is that in which the central point of the roller moves. In determining the positions of the axes, the rollers are assumed to engage against the straight side wall portions.

In FIG. 6, the paths of the three points on the axes of the rollers are shown by three lines designated A, B and X, and corresponding to planes A, B and X. The line A is dotted, line B is full, and line X is a dot-dash line. All of the endless paths indicated by these three lines are of equal extent, so that all points on the axis of each roller travel through the same distance in one circuit of the race or cup 31, and the rollers are thus maintained in parallel relation at all points along the cup side wall. It will be understood that because the rollers 45 may be shorter than the width of the inner race or cup side wall, the paths of the axial end and center points of the rollers are not necessarily precisely the same as the lines A, B and X, but the lines do represent the paths of the roller axes in the respective planes A, B and X.

The end portions 35 of the cup 31, of course, are transfer portions for movement of the rollers from one straight side portion 32 to the other, which provide load surfaces only one of which is subjected to load at a time in normal operation, as is usual. The rollers 45 are of course not under load when passing through the curved end or transfer portions of the bearing. The curvature of the end or transfer portions for achieving the desired avoidance of skewing, sliding, or frictional movement of the rollers by maintenance of parallelism of the rollers is illustrated for the present bearing by the successive cross-sectional views of FIGS. 8 to 13, inclusive, the sections being taken at intervals of 15° through one-half of the curvature or extent of one of the transfer portions. FIG. 7 shows on an enlarged scale portions of the paths A, B and X previously described, at one end of the bearing, extending half way around the curved end. As evident from this figure, the curvature of each of lines A and B is arcuate, and in fact semicircular, respectively on a radius equal to half the distance between the straight portions thereof. The centers are, of course, so located that the lengths of the arcs at the ends will complement the straight portions of the lines or paths to provide the same length for each, or in other words the center for an end curve of line A is located longitudinally outwardly of the corresponding center of curvature of line B. The end portion of line X is a smooth curve, but not arcuate, being somewhat parabolic or elliptical. The portion of the end curve of line B shown in FIG. 7 is divided into arcs from 15° to 90° at 15° intervals, beginning with the juncture of the curve with the straight portion of the line and FIGS. 8 to 13 inclusive show the cross sections of the bearing cup and cap at each of these intervals. The planes A, B and X are indicated in each of these figures, as well as the 22½° angle or slope of the adjacent straight or planar side wall portion 32, which is represented by the dotted line designated S. In FIG. 8, taken at 15° from the end of the straight side portion, the cross section differs only slightly from that through the side portion itself. In FIG. 9, taken at the 30° point shown in FIG. 7, the difference is more marked, and so on through the successive cross sections of FIGS. 10 to 13, the wall of the cup 31 swinging, so to speak, from the angle of 22½° to an angle of about 14° in the opposite direction at the center of the end curve, as shown in FIG. 13, which of course corresponds to FIG. 4. It will be evident that the peripheral flange 36 about the mouth of cup 31 changes its relation to the plane B as it progresses to the midpoint of the curved end portion 35, its inner surface shifting relative to that plane so that it is intersected by the plane at its outer edge, as in FIG. 9, then so that it lies completely below (as viewed in the drawings) the plane, as in FIGS. 10 and 11, and finally comes to a relative position in which plane B intersects it at the inner edge, as in FIG. 13. At the same time, the peripheral flange 40 of the cap changes its position relative to the plane A mainly by a change of angle, the maximum spacing of its inner surface from the plane remaining generally constant, although reduced somewhat at the 60° point, as shown in FIG. 11.

The particular configuration of the end portions of the bearing will of course vary with differences in dimensions, angularity of the planar portions of the roller-supporting race or cup wall, distance between the sides of the bearing, and other factors, but this is merely a matter of calculation in any particular case. In each instance, the principle involved is the same as that exemplified by the disclosed embodiment of the invention.

The lip 37 of the flange 36 at the curved end portion 35 is extended so as to approach the lip 41 of flange 40, as shown in FIGS. 9 to 13, so as to assure that the rollers in passing through the transfer portion of the bearing cannot fall or be forced out of the race. It will be apparent that instead of extending the lip 37 toward the lip 41, the lip 41 may be extended in the opposite direction so as to approach the lip 37, or both lips may be extended toward each other, and achieve the same purpose of retaining the rollers 45 in the bearing.

It will be understood that the disclosed embodiments of the invention are illustrative, and that many changes and modifications may be made without departing from the inventive concept disclosed, and accordingly it is not intended to limit the invention otherwise than as required by the appended claims.

I claim:

1. In combination with a spline or the like having undercut ends and flat sides diverging in the direction of the base thereof, a recirculating bearing comprising a cup member of cross section corresponding to that of the spline and of a length greater than that of the spline, said cup member having an apertured bottom and a continuous wall extending from the edge of said bottom with substantially straight parallel elongated side portions diverging in the direction away from said bottom in correspondence to said spline side divergence and also having arcuately curved end portions integrally connecting adjacent ends of said side portions, said cup member having an outturned flange along one peripheral edge thereof opposite said apertured bottom, the curvature of each of said end portions along said other peripheral edge being on a smaller radius than the curvature thereof along said one peripheral edge and about a center spaced longitudinally outwardly relative to the center of curvature on the larger radius, said flange extending continuously along said one peripheral edge and being disposed substantially perpendicularly to the wall throughout the extent of said one peripheral edge, a lip on the outer edge of the flange parallel to the wall defining a channel with the flange and wall, a plurality of bearing rollers in side-by-side relation each engaging the wall transversely thereof with one end in said channel, a cap member engageable with said apertured bottom of the cup member having a continuous marginal portion projecting outwardly of said other peripheral edge a distance equal to the width of said cup flange and having a lip parallel to the wall and extending toward said lip on the cup flange to define another channel receiving the other ends of said rollers, the distance between said flange and marginal portion being slightly greater than the length of the rollers and the width of said channels being slightly greater than the roller diameter, and a tongue struck from the cap member adjacent each end thereof extending through said apertured bottom of the cup member for resilient engagement with the undercut end of the spline for securement of the cap and cup members in assembled relation on the spline, the lengths of both peripheral edges of the cup wall being substantially equal, whereby the paths of the midpoints at the opposite ends of each roller in a circuit thereof about the cup wall are of substantially the same length.

2. In combination with a spline or the like having flat sides diverging from each other in the direction of the base thereof, a recirculating bearing comprising a cup member of cross section corresponding to that of the spline and of a length greater than that of the spline, said cup member having a continuous wall with a pair of endless peripheral edges and having substantially planar elongated side portions diverging from each other in correspondence to said spline side divergence, said peripheral edges including parallel edge portions along said planar side portions with one pair of corresponding edge portions of the side portions spaced farther apart transversely of the cup member than the other pair of corresponding edge portions, said wall also having curved end portions connecting adjacent ends of said side portions and each having one edge portion connecting the adjacent ends of said one pair of parallel edge portions and another edge portion connecting the adjacent ends of the other pair of parallel edge portions, said side portions of each end portion extending in an arc and the centers being spaced longitudinally relative to each other to afford the same total length for both peripheral edges, a plurality of bearing rollers in side-by-side relation each engaging the wall transversely thereof and extending completely thereabout in continuous progression with the opposite ends thereof adjacent the respective peripheral edges whereby the paths of the axial points at the opposite ends of each roller in a circuit thereof about the cup wall are of substantially the same length, means retaining the rollers in engagement with the wall, and means for securing the bearing on the spline.

3. In combination with a spline or the like having flat sides diverging from each other in the direction of the base thereof, a recirculating bearing comprising a cup member of cross section corresponding to that of the spline and of a length greater than that of the spline and having an outturned peripheral flange, said cup member having a continuous wall with a pair of continuous peripheral edges and having substantially planar elongated side portions diverging from each other in correspondence to said spline side divergence and also having arcuately curved end portions integrally connecting adjacent ends of said side portions, one of said peripheral wall edges including a pair of parallel edge portions of said planar side portions and a curved edge portion of each end portion connecting the adjacent ends of said parallel edge portions, the other peripheral edge including another pair of parallel edge portions of the planar portions spaced apart farther than the parallel edge positions of said one peripheral edge and also including another curved edge portion of each end portion connecting said farther-spaced parallel edge portions, the curved edge portions in each peripheral edge having a curvature and extent different from those of the curved edge portions in the other to provide with the adjacent parallel edge portions a common length for both peripheral edges, a plurality of bearing rollers in side-by-side relation each engaging the wall transversely thereof and extending thereabout in continuous progression with the opposite ends thereof adjacent the respective peripheral edges, and means retaining the rollers engaged on the wall.

4. A recirculating roller bearing for relatively reciprocable members subject to loads applied transversely of the direction of movement thereof, comprising an elongated race member having a pair of spaced planar side portions on opposite sides of a central plane each inclined to said plane at an angle such as to be substantially normal to the direction of application thereto of the transverse load and with one edge of each planar side portion spaced transversely from the corresponding one edge of the other side portion by a distance greater than the spacing between the other edges thereof, curved end portions connecting the planar side portions having each one edge extending as a connecting continuation of said one edge of each of the side portions whereby to define therewith one peripheral edge of the race member and another edge extending as a connecting continuation of said other edges of the side portions whereby to define therewith an other peripheral edge of the race member, each of said edges of each curved end portion extending arcuately on a radius equal to half the spacing between the respectively connected edges of the side portions, the center of arc of said other edge of each end portion being located longitudinally outwardly relative to the center of arc of said one edge of the end portion to provide the same total length for each of the peripheral edges of the race member, a flange projecting outwardly from each of the peripheral edges of the race member and extending substantially normal to the planar side portions along the lengths of the side portions, retaining lips on the edges of said flanges, a plurality of rollers disposed on the race member in parallel relation to each other extending transversely between the flanges in continuous progression about the race member, and means for securing the bearing to one of the reciprocable members in engageable relation with the other reciprocable member.

5. A recirculating roller bearing for relatively reciprocable members subject to loads applied transversely of the direction of movement thereof, comprising an elongated race member having a pair of spaced planar side portions on opposite sides of a central plane each inclined to said plane at an angle such as to be substantially normal to the direction of application thereto of the transverse load and with one edge of each planar side portion spaced transversely from the corresponding one edge of the other side portion by a distance greater than the spacing between the other edges thereof, curved end portions connecting the planar side portions having each one edge extending as a connecting continuation of said one edge of each of the side portions whereby to define therewith one peripheral edge of the race member and another edge extending as a connecting continuation of said other edges of the side portions whereby to define therewith an other peripheral edge of the race member, each of said edges of each curved end portion extending arcuately on a radius equal to half the spacing between the respectively continued edges of the side portions, the center of arc of said other edge of each end portion being located longitudinally outwardly relative to the center of arc of said one edge of the end portion to provide the same total length for each of the peripheral edges of the race member, a plurality of rollers disposed in parallel relation to each other transversely on the race member in continuous progression thereabout, and means for retaining the rollers on the race member.

6. A recirculating roller bearing for relatively reciprocable members subject to loads applied transversely of the direction of movement thereof, comprising an elongated race member having a continuous wall providing an endless race surface defined between a pair of endless peripheral edges, said wall including a pair of spaced planar side portions and curved end portions connecting the planar side portions, said side portions lying on opposite sides of a central plane each inclined to said plane at an angle such as to be substantially normal to the direction of application thereto of the transverse load and disposing in parallel relation the portions of said peripheral edges extending along the planar side portions with one pair of corresponding edge portions spaced transversely from each other farther than the other pair of corresponding edges thereof, each of said curved end portions having one edge portion connecting the adjacent ends of said one pair of side portion edge portions on an arc with a radius equal to half the spacing between said one pair of parallel edge portions, said end portions also each having another edge portion connecting the adjacent ends of said other pair of edge portions on an arc with a radius equal to half the spacing between said other pair of parallel edge portions about a center located longitudinally outwardly relative to the center of arc of said one edge portion of the end portion to provide the same total length for each of the peripheral edges of the race member, and a plurality of rollers disposed in parallel relation to each other transversely on the race member in continuous progression thereabout.

7. A recirculating roller bearing for relatively reciprocable members subject to loads applied transversely of the direction of movement thereof, comprising an elongated race member having a continuous wall affording an endless race surface defined between spaced endless peripheral edges thereof, said wall including a pair of spaced planar side portions on opposite sides of the central plane of the race member each inclined to said plane at an angle such as to lie substantially normal to the direction of application thereto of the transverse load and also including curved end portions connecting the planar side portions, one pair of corresponding edges of each planar side portion being spaced apart transversely more widely than the other pair of corresponding edges of the side portions, said more widely spaced edges of the side portions continuing in an arc along each of the curved end portions on a radius equal to half said wider spacing and the more closely spaced edges of the side portions continuing in an arc along each of the end portions on a radius equal to half said closer spacing about a center spaced longitudinally outwardly of the center of arc of said continuation of the more widely spaced edges to provide the same total length for each of said peripheral edges, continuous flanges along each of the peripheral edges extending substantially normal to the planar side portions along the lengths of the side portions, retaining lips on the flanges, a plurality of rollers disposed on the race surface extending transversely between the flanges in continuous progression about the race member and in parallel relation to each other, and means for securing the bearing to one of the reciprocable members in engageable relation with the other reciprocable member.

8. A recirculating roller bearing for relatively reciprocable members subject to loads applied transversely of the direction of movement thereof, comprising an elongated race member having a continuous wall affording an endless race surface defined between spaced endless peripheral edges thereof, said wall including a pair of spaced planar side portions on opposite sides of the central plane of the race member each inclined to said plane at an angle such as to lie substantially normal to the direction of application thereto of the transverse load and also including curved end portions connecting the planar side portions, one pair of corresponding edges of each planar side portion being spaced apart transversely more widely than the other pair of corresponding edges of the side portions, said more widely spaced edges of the side portions continuing in a smooth curve along each of the end portions and the more closely spaced edges of the side portions continuing in another smooth curve along each of the end portions different in curvature and extent from the first-mentioned smooth curve, the lengths of said curves and parallel edges being selected to provide the same total length for each of said endless peripheral edges, a plurality of rollers disposed on the race surface extending transversely thereof in continuous progression about the race member and in parallel relation to each other, and means for retaining the rollers on the race member.

References Cited by the Examiner

UNITED STATES PATENTS 2,983,120    5/61    White _____ 64—23

ROBERT C. RIORDON, *Primary Examiner.*

FRANK SUSKO, *Examiner.*